US012741331B2

(12) United States Patent
Shimizu et al.

(10) Patent No.: US 12,741,331 B2
(45) Date of Patent: Sep. 22, 2026

(54) ELECTROCHEMICAL MACHINING DEVICE

(71) Applicant: KABUSHIKI KAISHA TOYOTA JIDOSHOKKI, Kariya (JP)

(72) Inventors: Tatsuya Shimizu, Aichi-ken (JP); Masahiro Aono, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 611 days.

(21) Appl. No.: 18/038,327

(22) PCT Filed: Sep. 24, 2021

(86) PCT No.: PCT/JP2021/035015
§ 371 (c)(1),
(2) Date: May 23, 2023

(87) PCT Pub. No.: WO2022/113505
PCT Pub. Date: Jun. 2, 2022

(65) Prior Publication Data

US 2024/0091872 A1 Mar. 21, 2024

(30) Foreign Application Priority Data

Nov. 25, 2020 (JP) ................................ 2020-195144

(51) Int. Cl.
*B23H 3/10* (2006.01)

(52) U.S. Cl.
CPC ..................................... *B23H 3/10* (2013.01)

(58) Field of Classification Search
None
See application file for complete search history.

(56) References Cited

U.S. PATENT DOCUMENTS 4,851,090 A 7/1989 Burns et al.
2017/0282267 A1* 10/2017 Gao ......................... F01D 5/34
2020/0130083 A1 4/2020 Kim et al.

FOREIGN PATENT DOCUMENTS

JP 50-4332 B 2/1975
JP H01-222820 A 9/1988
JP 64-005732 A 1/1989
KR 10-2020-0046531 A 5/2020
KR 10-2020-0047459 A 5/2020

OTHER PUBLICATIONS

Chinese Office Action dated Jun. 28, 2025 in Application No. 202180070931.7.
Extended European Search Report issued Nov. 18, 2024 in application No. 21897483.0.

* cited by examiner

*Primary Examiner* — Stefanie S Wittenberg
(74) *Attorney, Agent, or Firm* — Sughrue Mion, PLLC

(57) ABSTRACT

An electrochemical machining device that electrochemically machines a preformed impeller including a plurality of blades arranged along an outer periphery of the impeller. The electrochemical machining device includes a discharge electrode having an electrode surface extending along a machined surface of one of the plurality of blades, and a first nozzle that is disposed adjacently to the discharge electrode and has a first outlet from which electrolyte solution is discharged, the electrolyte solution flowing into a space between the electrode surface and the machined surface along the electrode surface.

5 Claims, 10 Drawing Sheets

ELECTROCHEMICAL MACHINING DEVICE

CROSS-REFERENCE TO RELATED APPLICATIONS

This application is a National Stage of International Application No. PCT/JP2021/035015 filed Sep. 24, 2021, claiming priority based on Japanese Patent Application No. 2020-195144 filed Nov. 25, 2020, the contents of all of which are incorporated herein by reference in their entirety.

TECHNICAL FIELD

The present invention relates to an electrochemical machining device.

BACKGROUND ART

Japanese Patent Application Publication No. H01-222820 (Patent Document 1) discloses a configuration of an electrochemical machining device for an impeller. The electrochemical machining device described in Patent Document 1 includes a pair of electrodes for machining and a liquid introduction groove serving as an electrolyte solution supply passage. Each of the pair of electrodes is formed in a substantially blade-like shape having a blade machining surface. The liquid introduction groove is open toward an area around a middle position between base portions of the pair of electrodes.

CITATION LIST

Patent Document

Patent Document 1: Japanese Patent Application Publication No. H01-222820

SUMMARY OF INVENTION

Technical Problem

The electrochemical machining device described in Patent Document 1 is configured to form a plurality of blades one by one with the pair of electrodes for machining by electrochemical machining. Electrolyte solution is supplied to the middle position between the pair of discharge electrodes for machining. In such an electrochemical machining process of the impeller, it takes a long processing time and a distribution of the electrolyte solution supplied between the pair of electrodes for machining is made nonuniform, so that machining accuracy decreases.

The present invention has been made in view of the above circumstances and is directed to providing an electrochemical machining device that machines an impeller at high accuracy in a short processing time.

Solution to Problem

An electrochemical machining device according to the present invention is configured to electrochemically machine a preformed impeller including a plurality of blades arranged along an outer periphery of the impeller. The electrochemical machining device includes a discharge electrode and a first nozzle. The discharge electrode has an electrode surface extending along a machined surface of one of the plurality of blades. The first nozzle is disposed adjacently to the discharge electrode. The first nozzle has a first outlet from which electrolyte solution is discharged, the electrolyte solution flowing into a space between the electrode surface and the machined surface along the electrode surface.

In an embodiment of the present embodiment, the electrochemical machining device further includes a second nozzle. The second nozzle is disposed above the discharge electrode. The second nozzle has a second outlet from which electrolyte solution is discharged downward, the electrolyte solution flowing into the space between the electrode surface and the machined surface.

In the embodiment of the present invention, the first nozzle and the second nozzle each have a passage of the electrolyte solution. At least one of the passage of the first nozzle and the passage of the second nozzle has a flow conditioner.

In the embodiment of the present invention, the discharge electrode and the first nozzle are integrally formed such that the discharge electrode and the first nozzle are attachable to and detachable from each other.

In the embodiment of the present invention, the discharge electrode and the second nozzle are integrally formed such that the discharge electrode and the second nozzle are attachable to and detachable from each other.

Advantageous Effect of Disclosure

According to the present invention, it is possible to machine the impeller at high accuracy in a short processing time.

BRIEF DESCRIPTION OF DRAWINGS

FIG. 3 is a longitudinal cross-sectional view illustrating the configuration of the electrochemical machining device of FIG. 2.

FIG. 4 is a plan view illustrating a state where a plurality of discharge electrodes move inward in a radial direction of a rotary shaft in the electrochemical machining device according to the embodiment of the present invention.

DESCRIPTION OF EMBODIMENTS

Figure 1:
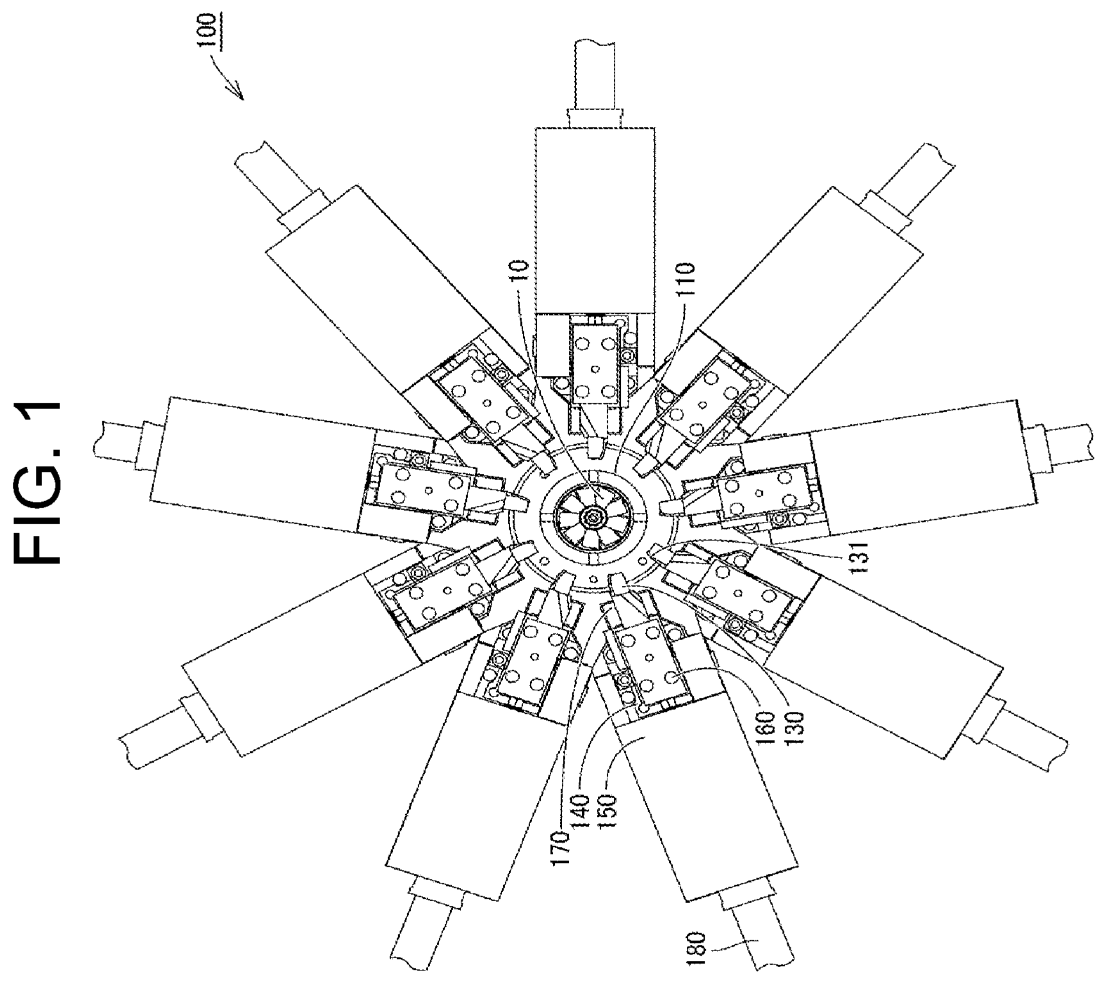
FIG. 1 is a plan view illustrating an electrochemical machining device before a machining process according to an embodiment of the present invention.

The following will describe an electrochemical machining device according to an embodiment of the present invention with reference to the drawings. In the following description, the same or substantially equivalent elements are denoted by the same reference numerals, and a redundant description is omitted.

Figure 2:
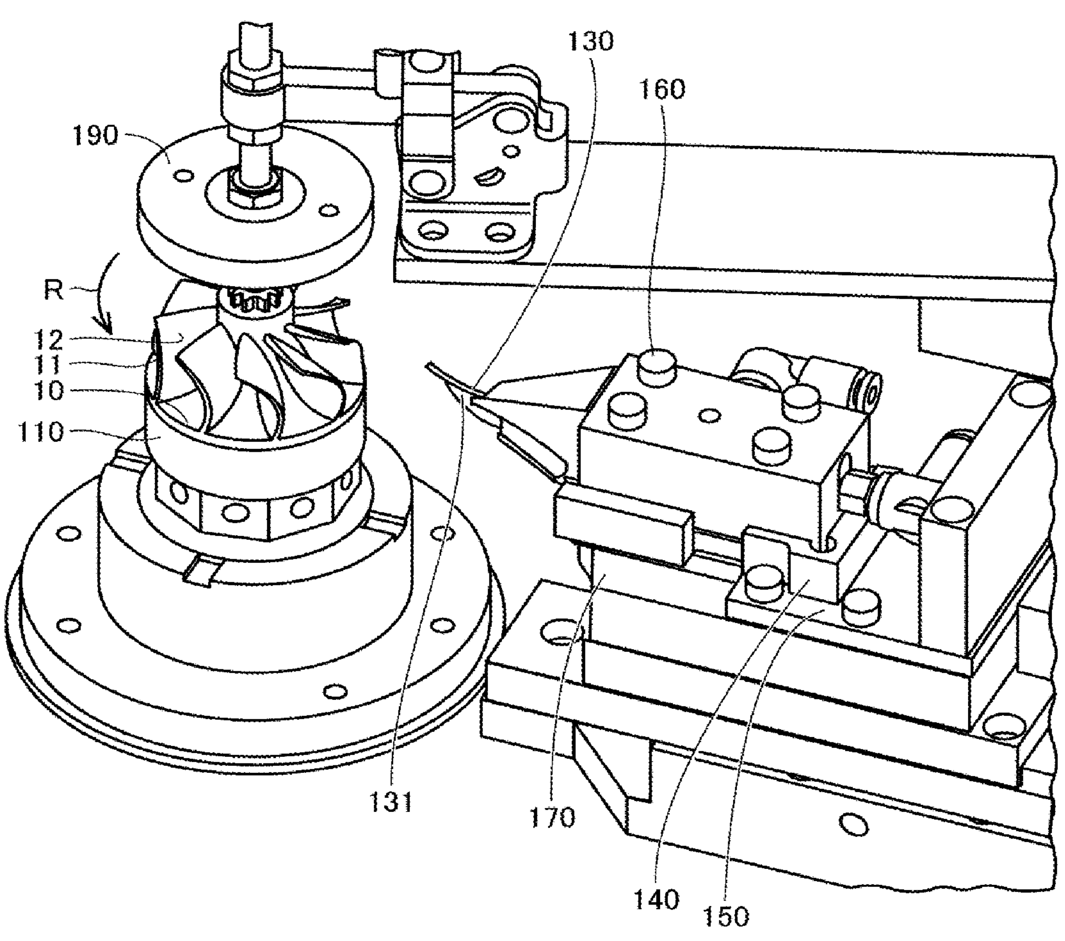
FIG. 2 is a perspective view illustrating a configuration of the electrochemical machining device of FIG. 1.
Figure 3:
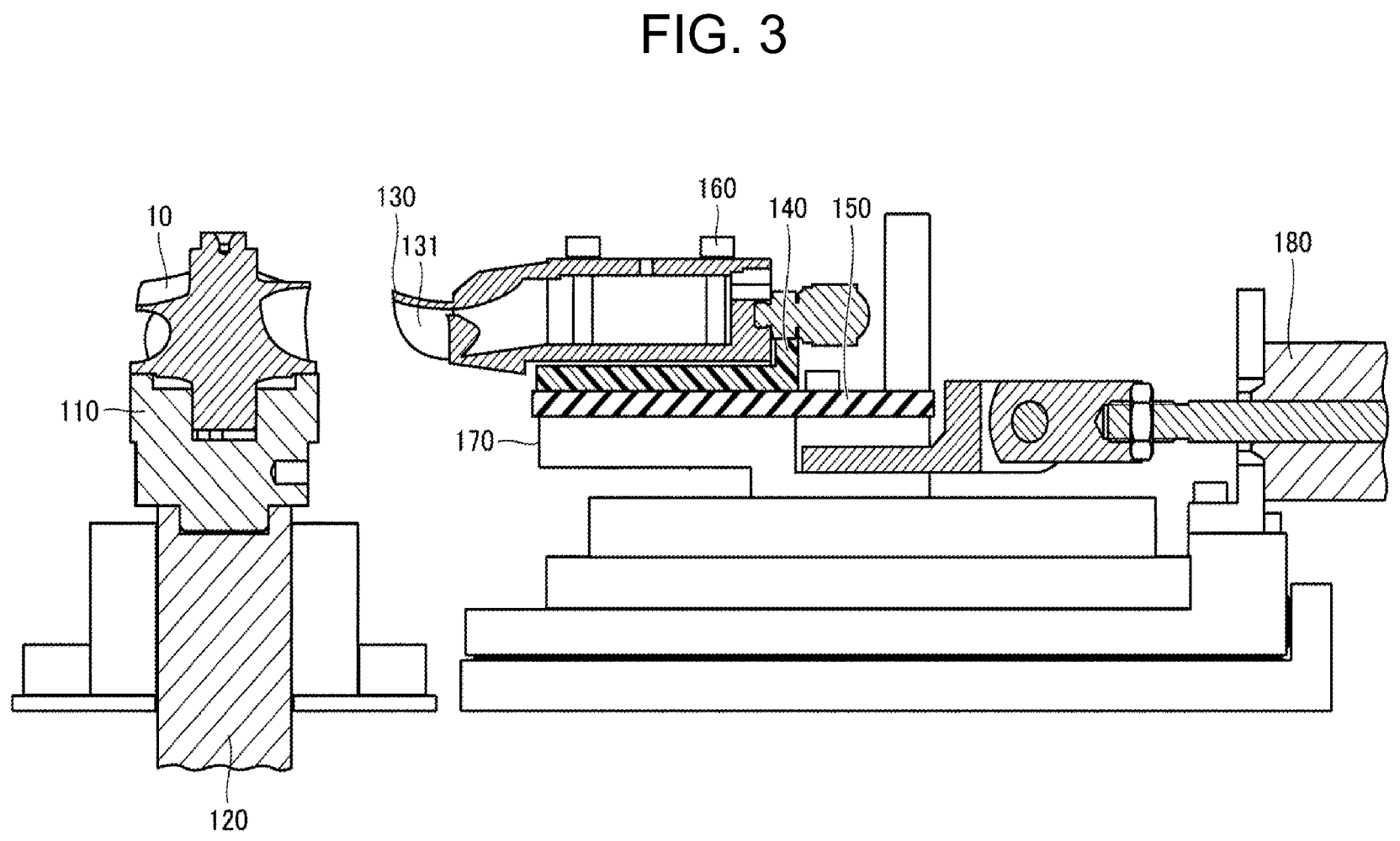

FIG. 1 is a plan view illustrating the electrochemical machining device before a machining process according to the embodiment of the present invention. FIG. 2 is a perspective view illustrating a configuration of the electrochemical machining device of FIG. 1. FIG. 3 is a longitudinal cross-sectional view illustrating the configuration of the electrochemical machining device of FIG. 2. In FIGS. 1 and 3, a clamping mechanism described later is not illustrated. In FIGS. 2 and 3, one discharge electrode of a plurality of discharge electrodes is only illustrated.

As illustrated in FIGS. 1 to 3, an electrochemical machining device 100 according to the embodiment of the present invention is configured to electrochemically machine a preformed impeller 10 including a plurality of blades 11 arranged along an outer periphery of the impeller 10. The impeller 10 is, for example, made of titanium alloy. The impeller 10 before an electrochemical machining process is preformed by casting, for example. The impeller 10 is, for example, used as a turbine wheel. The plurality of blades 11 each have a machined surface 12 that is twisted and curved. In the present embodiment, the impeller 10 has nine blades 11. However, the number of the blades 11 in the impeller 10 is not limited to nine, and only needs to be two or more.

The electrochemical machining device 100 includes a support base 110, a rotary shaft 120, and a plurality of discharge electrodes 130. The impeller 10 is supported by the support base 110 such that the impeller 10 is attachable to and detachable from the support base 110. The rotary shaft 120 rotatably holds the support base 110. The support base 110 is connected to the rotary shaft 120 such that the support base 110 is attachable to and detachable from the rotary shaft 120. The rotary shaft 120 is connected to a rotation driving unit (not illustrated).

The plurality of discharge electrodes 130 are arranged on a circumference about the rotary shaft 120 at a regular interval. The plurality of discharge electrodes 130 has one-to-one correspondence with the plurality of blades 11, and are each attachable to and detachable from the corresponding blade 11. In the present embodiment, the electrochemical machining device 100 includes the nine discharge electrodes 130. The one discharge electrode 130 is disposed such that one discharge electrode 130 is attachable to and detachable from one blade 11.

The plurality of discharge electrodes 130 each have an electrode surface 131 extending along the machined surface 12 of the blade 11. That is, the discharge electrodes 130 each have the electrode surface 131 extending along the machined surface 12 of the corresponding one of the plurality of blades 11. The electrode surface 131 is twisted and curved.

The electrochemical machining device 100 further includes a plurality of electrode holders 170 and a plurality of positioning plates 140. The discharge electrode 130 is held by each of the electrode holders 170 such that the discharge electrode 130 is movable in a radial direction of the rotary shaft 120. The plurality of electrode holders 170 has one-to-one correspondence with the plurality of discharge electrodes 130. In the present embodiment, the electrochemical machining device 100 includes nine electrode holders 170. Each of the nine electrode holders 170 is disposed so as to slidably move straight.

Each of the plurality of discharge electrodes 130 is connected to the corresponding electrode holder 170 of the plurality of electrode holders 170 such that the discharge electrode 130 is attachable to and detachable from the electrode holder 170. In the present embodiment, the discharge electrode 130 has a through hole. The discharge electrode 130 is fastened to the electrode holder 170 by a bolt 160 inserted through the through hole.

An insulation plate 150 is disposed on an upper surface of each of the plurality of electrode holders 170. The insulation plate 150 electrically insulates the discharge electrode 130 against the electrode holder 170. The insulation plate 150 is made of insulating resin, such as epoxy resin.

Each of the positioning plates 140 is fixed on the insulation plate 150. The positioning plate 140 has a flat upper surface on which the discharge electrode 130 is placed, a side wall being in contact with a side surface of the discharge electrode 130, and a back wall being in contact with an end surface of the discharge electrode 130 on a base side thereof.

The discharge electrode 130 placed on the upper surface of the positioning plate 140 is positioned on the electrode holder 170 such that the side wall of the positioning plate 140 is in contact with the side surface of the discharge electrode 130 and the back wall of the positioning plate 140 is in contact with the end surface of the discharge electrode 130 on the base side thereof. That is, the plurality of positioning plates 140 have one-to-one correspondence with the plurality of discharge electrodes 130, and are each placed on the corresponding one of the plurality of electrode holders 170 to position the discharge electrode 130. A shim may be inserted to a space between the discharge electrode 130 and the positioning plate 140 in order to finely adjust a position of the discharge electrode 130.

The electrode surface 131 of the discharge electrode 130 positioned on each of the electrode holders 170, when the discharge electrode 130 moves inward in a radial direction of the rotary shaft 120 as described later, is located at a position at which the electrode surface 131 faces the machined surface 12 of the impeller 10 to be a machined target with a space between the electrode surface 131 and the machined surface 12.

The electrochemical machining device 100 further includes straight line drivers 180 that each drive the electrode holder 170 to move in the radial direction of the rotary shaft 120. In the present embodiment, nine straight line drivers 180 are provided in the electrochemical machining device 100, and the straight line drivers 180 are each connected to the corresponding electrode holder 170.

As illustrated in FIG. 2, the electrochemical machining device 100 further includes a clamping mechanism 190. The clamping mechanism 190 is provided so as to be movable in an upper and lower direction of the electrochemical machining device 100, and presses the impeller 10 supported by the support base 110 downward to clamp the impeller 10 to the support base 110.

Figure 4:
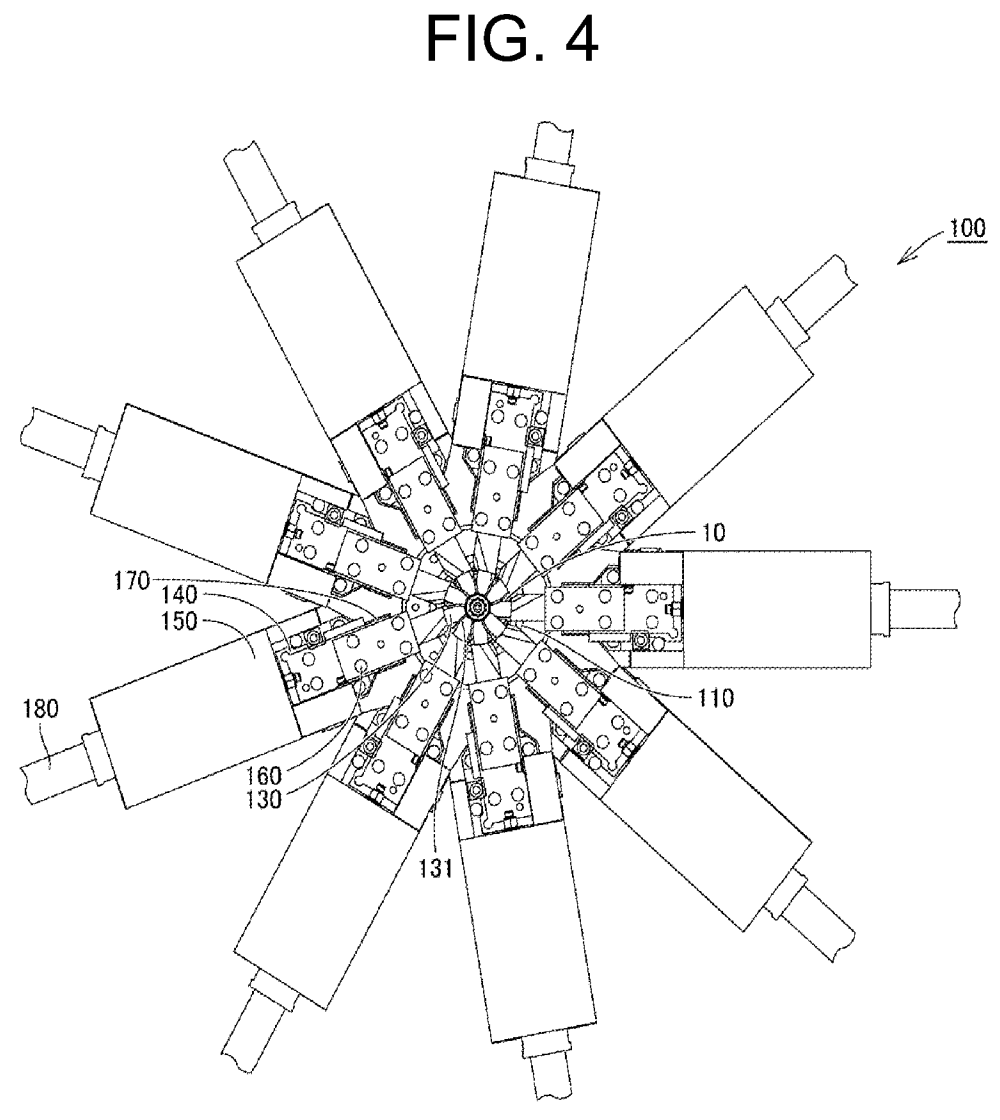

FIG. 4 is a plan view illustrating a state where the plurality of discharge electrodes move inward in the radial direction of the rotary shaft in the electrochemical machining device according to the embodiment of the present invention. FIG. 4 illustrates the discharge electrodes 130 that only move inward in the radial direction of the rotary shaft.

When the straight line drivers 180 are driven to cause the electrode holders 170 to approach the impeller 10, as illustrated in FIG. 4, the discharge electrodes 130 move inward in the radial direction of the rotary shaft 120. As a result, the electrode surface 131 of each of the discharge electrodes 130 faces the machined surface 12 of the blade 11 to be the machined target with the space between the electrode surface 131 and the machined surface 12.

Then, when the rotation driving unit rotates the rotary shaft 120 in a direction indicated by an arrow R in FIG. 2, the electrode surfaces 131 each approach the corresponding machined surface 12 to face each other. In the present embodiment, the machined surface 12 of each of the nine blades 11 has one-on-one correspondence with the electrode surface 131 of each of the nine discharge electrodes 130 at the same time. Each of the machined surface 12 and the corresponding electrode surface 131 approach to face each other. When a voltage is applied to the discharge electrode 130 in this state, electrochemical machining is performed. The blades 11 on which the electrochemical machining is performed are made thinner in thickness than the blades 11 of the preformed impeller 11 and made smooth in surface roughness of the machined surface 12.

Here, the following will describe a configuration of the discharge electrode 130 in the electrochemical machining device 100 in detail.

Figure 5:
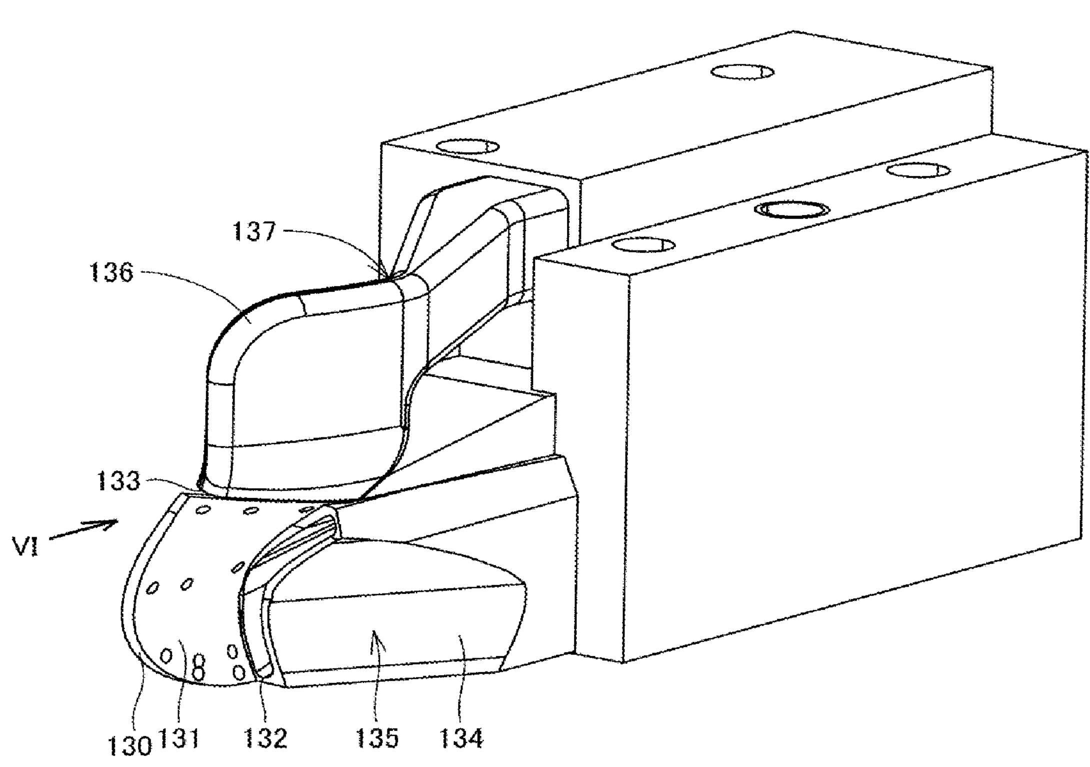
FIG. 5 is a perspective view illustrating a configuration of each of the discharge electrodes, a first nozzle, and a second nozzle in the electrochemical machining device according to the embodiment of the present invention.
Figure 6:
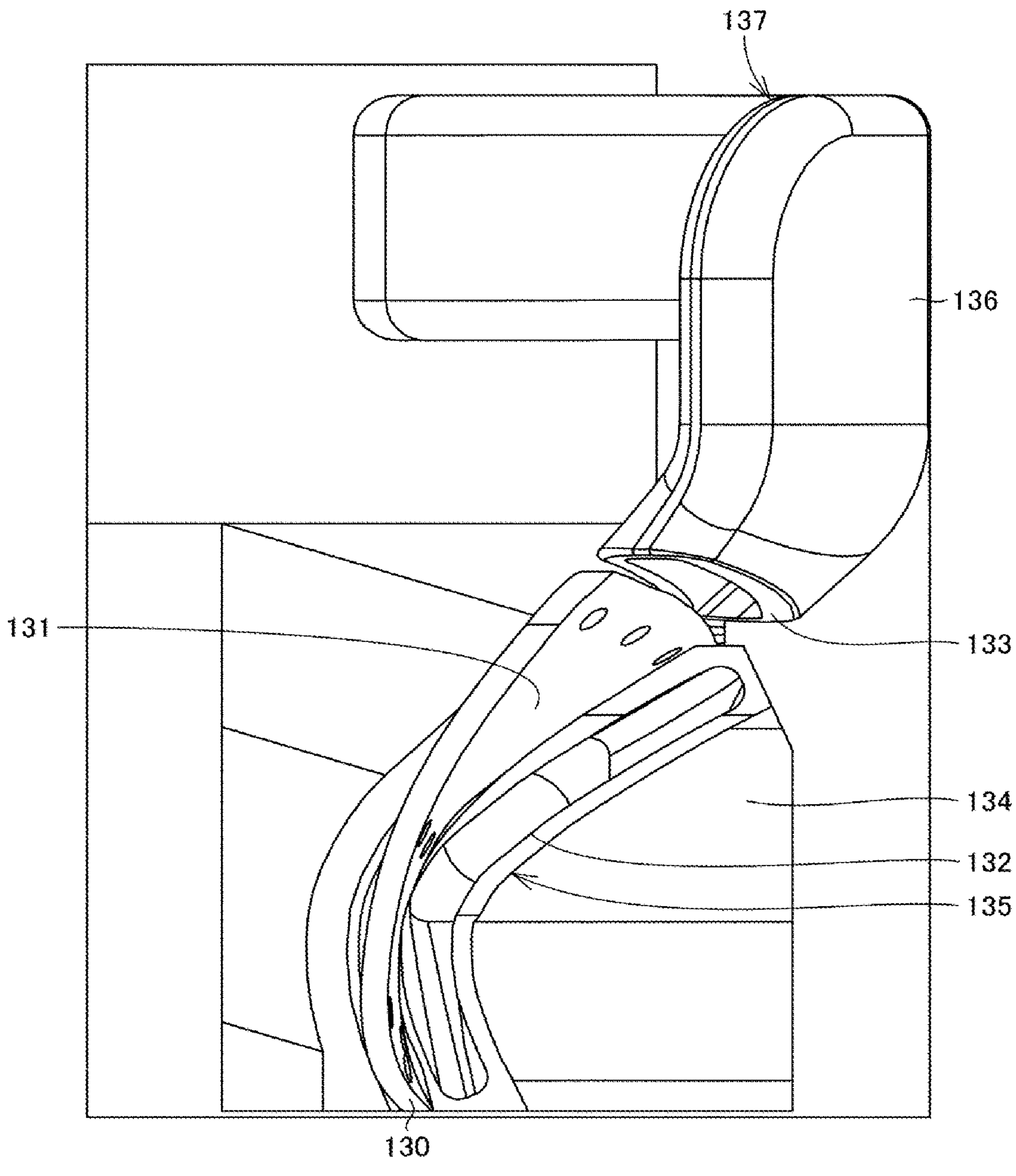
FIG. 6 is a front view illustrating the discharge electrode, the first nozzle, and the second nozzle of FIG. 5 as viewed in a direction of an arrow VI.
Figure 7:
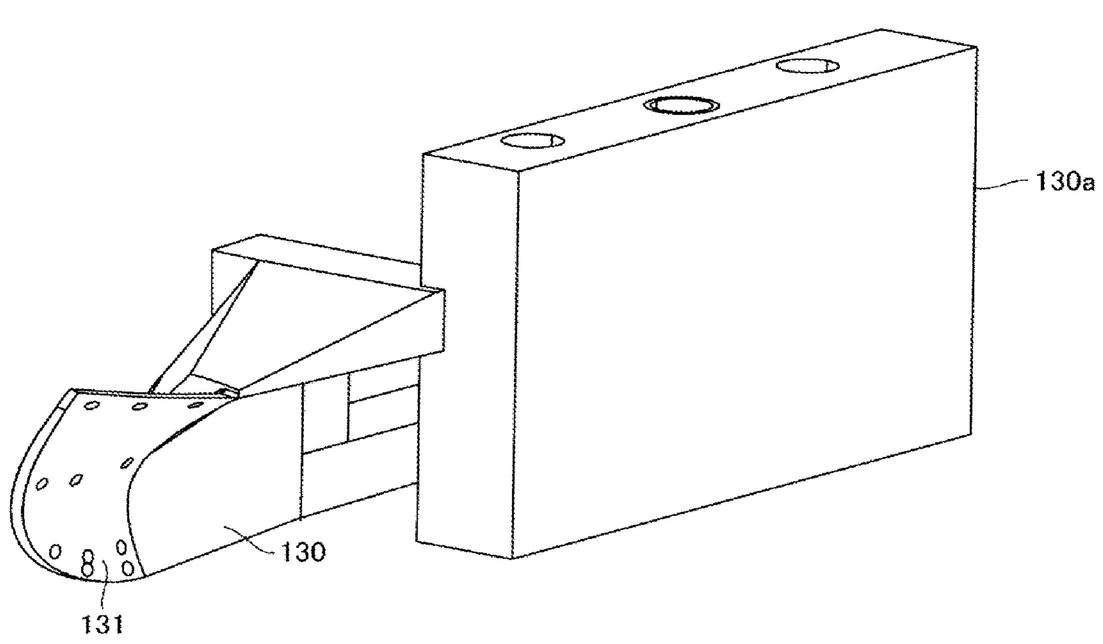
FIG. 7 is a perspective view illustrating a configuration of the discharge electrode in the electrochemical machining device according to the embodiment of the present invention.
Figure 8:
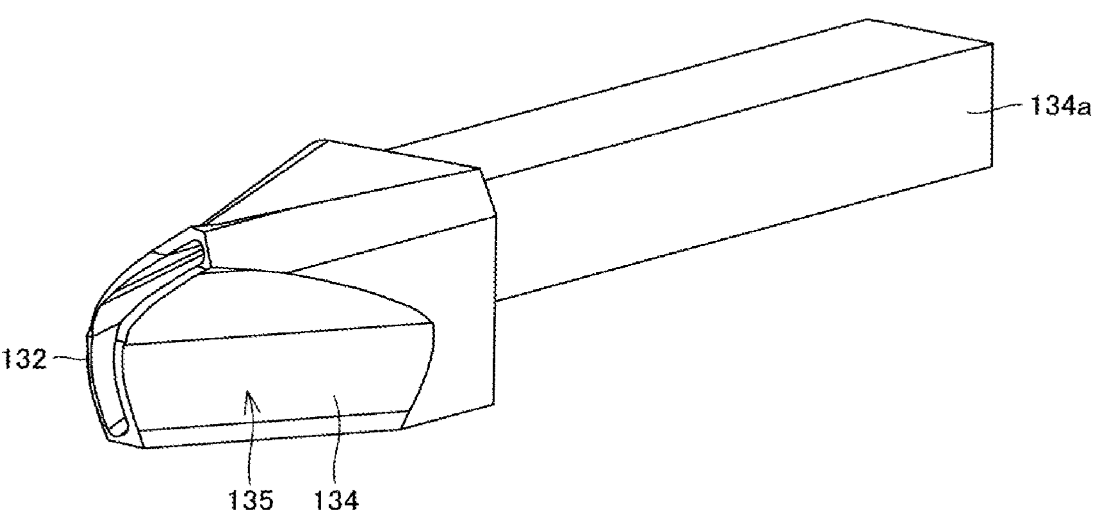
FIG. 8 is a perspective view illustrating a configuration of the first nozzle in the electrochemical machining device according to the embodiment of the present invention.
Figure 9:
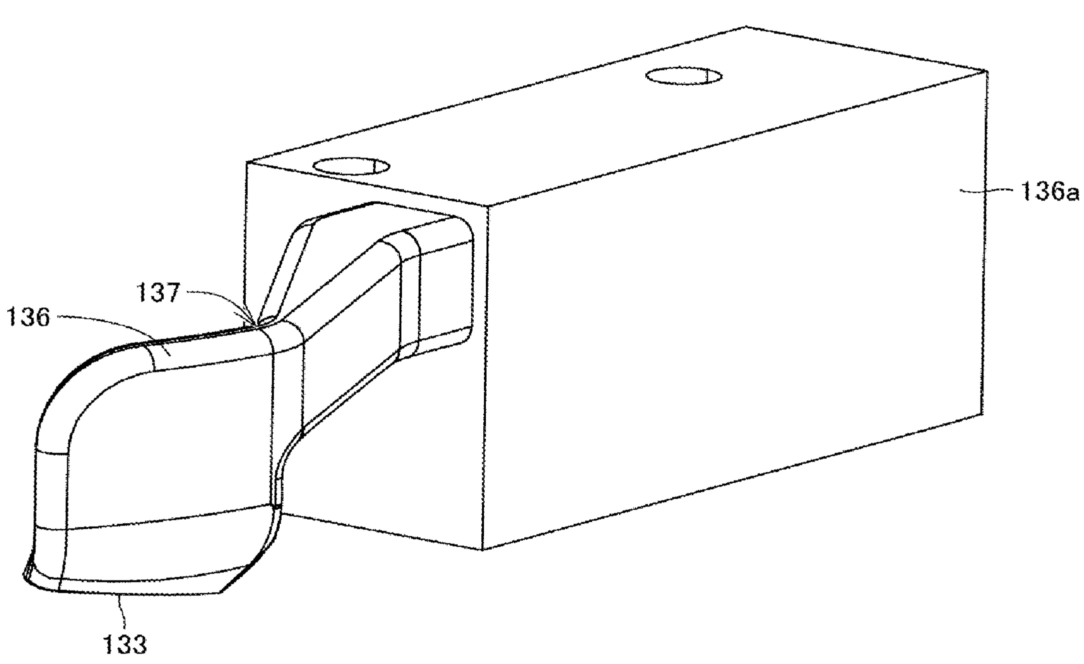
FIG. 9 is a perspective view illustrating a configuration of the second nozzle in the electrochemical machining device according to the embodiment of the present invention.

FIG. 5 is a perspective view illustrating a configuration of the discharge electrode, a first nozzle, and a second nozzle in the electrochemical machining device according to the embodiment of the present invention. FIG. 6 is a front view illustrating the discharge electrode, the first nozzle, and the second nozzle of FIG. 5 as viewed in a direction of an arrow VI. FIG. 7 is a perspective view illustrating the configuration of the discharge electrode in the electrochemical machining device according to the embodiment of the present invention. FIG. 8 is a perspective view illustrating a configuration of the first nozzle in the electrochemical machining device according to the embodiment of the present invention. FIG. 9 is a perspective view illustrating a configuration of the second nozzle in the electrochemical machining device according to the embodiment of the present invention.

As illustrated in FIGS. 5 to 9, the electrochemical machining device 100 further includes a first nozzle 134 and a second nozzle 136 that are integrally formed with each of the discharge electrodes 130 such that the first nozzle 134 and the second nozzle 136 are attachable to and detachable from the discharge electrode 130. The discharge electrode 130 is formed of conducting members. The first nozzle 134 and the second nozzle 136 are made of insulating resin, such as epoxy resin.

The discharge electrode 130, the first nozzle 134, and the second nozzle 136 may be formed of one conducting member. For example, the discharge electrode 130, the first nozzle 134, and the second nozzle 136 may be integrally and indivisibly formed with each other by a 3D printer, or the like using a conductive material.

As illustrated in FIGS. 5 and 6, the first nozzle 134 is disposed adjacently to the discharge electrode 130. In the present embodiment, nine first nozzles 134 are each disposed adjacently to the corresponding one of the nine discharge electrodes 130.

The first nozzle 134 has a first outlet 132 from which electrolyte solution is discharged, the electrolyte solution flowing into the space between the electrode surface 131 and the machined surface 12 along the electrode surface 131 in a state where the electrode surface 131 and the machined surface 12 approach to face each other as illustrated in FIG. 4. The first outlet 132 has a shape extending along the electrode surface 131 as viewed from a front side of the first outlet 132. The first nozzle 134 has a recess portion 135 on a side surface of the first nozzle 134, the side surface being on a side opposite to the electrode surface 131 across an end portion of the first nozzle 134 around the first outlet 132.

The second nozzle 136 is disposed above the discharge electrode 130. The second nozzle 136 has a second outlet 133 from which the electrolyte solution is discharged downward, the electrolyte solution flowing into the space between the electrode surface 131 and the machined surface 12 in the state where the electrode surface 131 and the machined surface 12 approach to face each other, as illustrated in FIG. 4. The second nozzle 136 is curved at a curved portion 137 as viewed from an upper side of the second nozzle 136, and the second outlet 133 is located above electrode surface 131. The second outlet 133 has a shape extending along the electrode surface 131 as viewed from a lower side of the second outlet 133.

As illustrated in FIG. 7, the discharge electrode 130 has a body 130*a* that is engaged with the first nozzle 134 and the second nozzle 136. As illustrated in FIG. 8, the first nozzle 134 has a first engaged portion 134*a* that has therein a passage of the electrolyte solution that flows into the first outlet 132 and is engaged with the body 130*a*. The discharge electrode 130 and the first nozzle 134 are integrally formed such that the discharge electrode 130 and the first nozzle 134 are attachable to and detachable from each other.

As illustrated in FIG. 9, the second nozzle 136 has a second engaged portion 136*a* that has therein a passage of the electrolyte solution that flows into the second outlet 133 and is engaged with the body 130*a*. The discharge electrode 130 and the second nozzle 136 are integrally formed such that the discharge electrode 130 and the second nozzle 136 are attachable to and detachable from each other.

Figure 10:
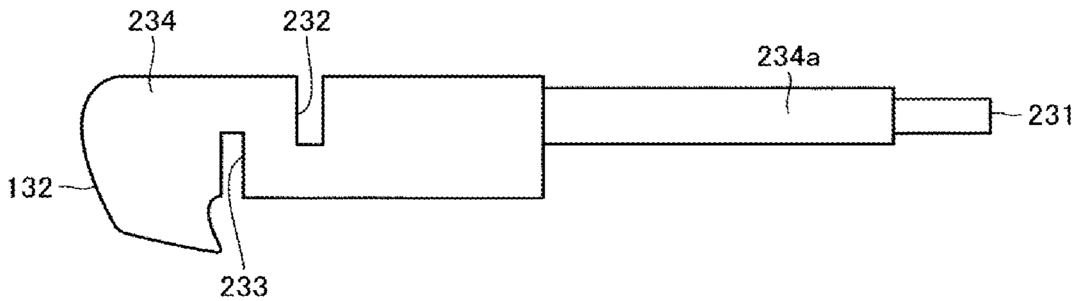
FIG. 10 is a plan view illustrating a configuration of a first nozzle according to a first modified example.

FIG. 10 is a plan view illustrating a configuration of a first nozzle according to a first modified example. As illustrated in FIG. 10, a first nozzle 234 according to the first modified example has an inlet 231 into which electrolyte solution flows and a first engaged portion 234*a* that has therein a passage of the electrolyte solution that flows into the first outlet 132 and is engaged with the body 130*a*.

A flow conditioner is formed in the passage of the electrolyte solution of the first nozzle 234. In the first modified example, a first narrow portion 232 and a second narrow portion 233 serving as the flow conditioner are formed in the first nozzle 234. With this configuration, the passage of the electrolyte solution of the first nozzle 234 is meandered between the inlet 231 and the first outlet 132, that is, the inlet 231 and the first outlet 132 does not communicate with each other in a straight line. A configuration of the flow conditioner is not limited to the narrow portion, and only needs to make a distribution of the electrolyte solution discharged from the first outlet 132 uniform. The flow conditioner may be formed in the second nozzle 136. When the flow conditioner is formed in the second nozzle 136, a distribution of electrolyte solution discharged from the second outlet 133 is made uniform.

Figure 11:
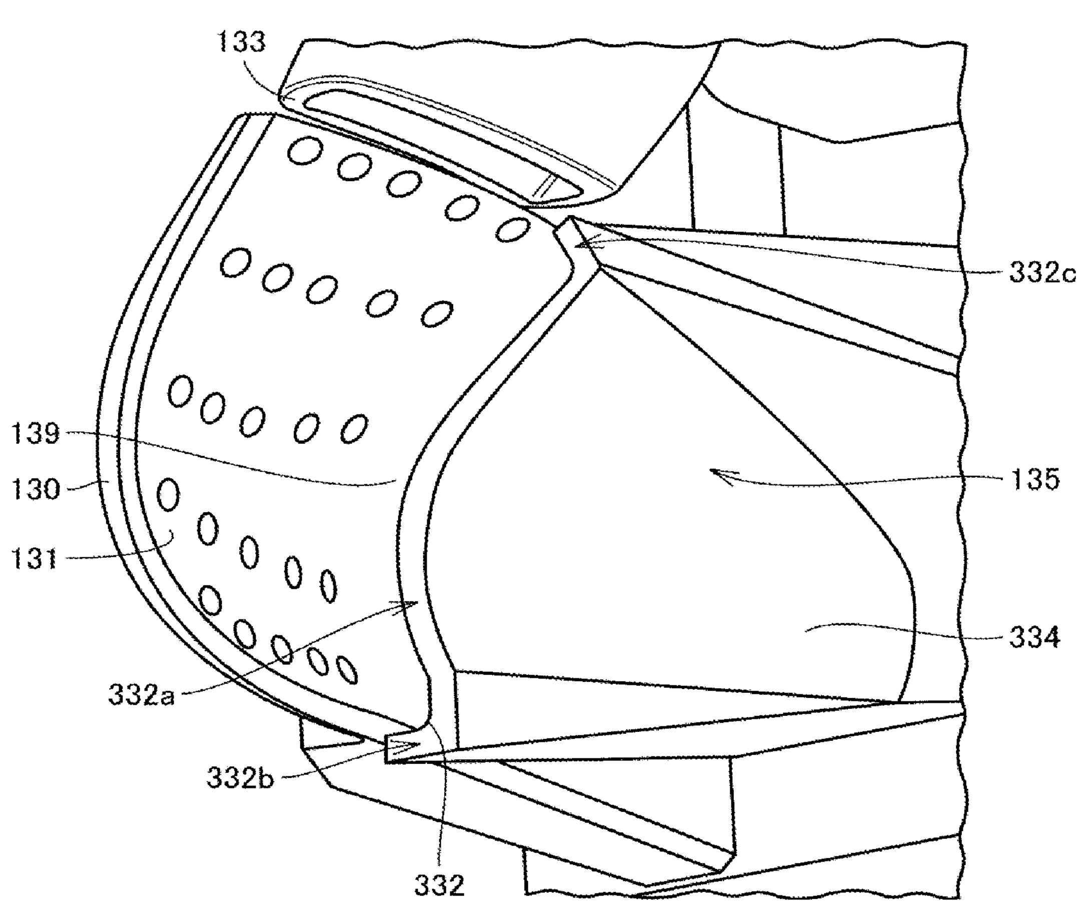
FIG. 11 is a perspective view partly illustrating an area around a first outlet of a first nozzle as viewed from a front side of the first nozzle in an electrochemical machining device according to a second modified example.

FIG. 11 is a perspective view partly illustrating an area around a first outlet of a first nozzle as viewed from a front side of the first nozzle in an electrochemical machining device according to a second modified example. As illustrated in FIG. 11, a first outlet 332 of a first nozzle 334 in the electrochemical machining device according to the second modified example is formed of a wall surface 139 being continuous with the electrode surface 131 of the discharge electrode 130, a facing surface 332*a* of the first nozzle 334 facing the wall surface 139 with a space between the facing surface 332*a* and the wall surface 139, and a first connection surface 332*b* and a second connection surface 332*c* connecting the wall surface 139 to the facing surface 332*a*.

In the second modified example, electrolyte solution discharged from the first outlet 332 of the first nozzle 334 flows along the wall surface 139 and the electrode surface 131 following the wall surface 139 to be supplied to the space between the electrode surface 131 and the machined surface 12. Thus, the electrolyte solution is supplied to the space between the electrode surface 131 and the machined surface 12 with a further uniform distribution of the electrolyte solution, so that the impeller 10 is machined at high accuracy.

Figure 12:
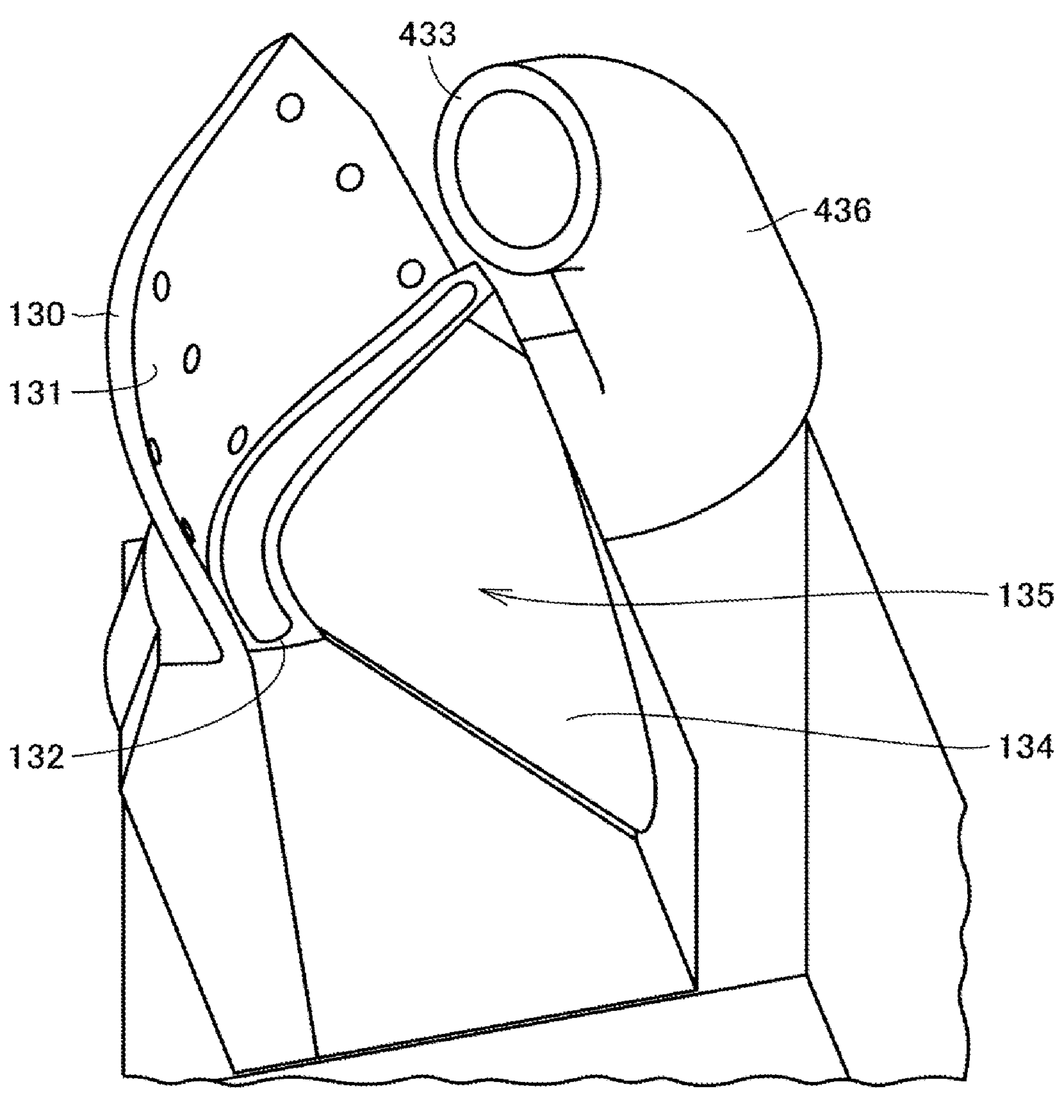
FIG. 12 is a perspective view partly illustrating an area around a second outlet of a second nozzle as viewed from a lower side of the second nozzle in an electrochemical machining device according to a third modified example.

FIG. 12 is a perspective view partly illustrating an area around a second outlet of a second nozzle as viewed from a lower side of the second nozzle in an electrochemical machining device according to a third modified example. As illustrate in FIG. 12, a second outlet 433 of a second nozzle 436 in the electrochemical machining device according to the third modified example has a substantially circular shape as viewed from the lower side of the second nozzle 436. An opening area of the second outlet 433 is larger than that of the second outlet 133 according to the embodiment. This configuration supplies the electrolyte solution to a portion on which the electrolyte solution discharged from the first outlet 132 is less likely to flow between the electrode surface 131 and the machined surface 12 in a focused manner while decreasing a flow speed of the electrolyte solution discharged from the second outlet 433.

The electrochemical machining device 100 according to the embodiment of the present invention is an electrochemical machining device which electrochemically machines the preformed impeller 10 including the plurality of blades 11 arranged along the outer periphery of the impeller 10. After the plurality of discharge electrodes 130 in the electrochemical machining device 100 each move inward in the radial direction of the rotary shaft 120, the rotary shaft 120 is rotated to cause each of the electrode surfaces 131 to approach and face the corresponding machined surface 12. In this state, the electrochemical machining process is performed. Thus, the plurality of blades 11 of the preformed impeller is electrochemically machined at the same time, so that variation of machining accuracy of the plurality of blades 11 is suppressed to machine the impeller 10 with high accuracy while a processing time for the electrochemical machining process is shortened.

In the electrochemical machining device 100 according to the embodiment of the present invention, the first nozzle 134 disposed adjacently to each of the discharge electrodes 130 has the first outlet 132 from which the electrolyte solution is discharged, the electrolyte solution flowing into the space between the electrode surface 131 and the machined surface 12 along the electrode surface 131. With this configuration, the electrolyte solution is supplied to the space between the electrode surface 131 and the machined surface 12 with a further uniform distribution of the electrolyte solution, so that the impeller 10 is machined at high accuracy.

In the electrochemical machining device 100 according to the embodiment of the present invention, the first nozzle 134 has the recess portion 135 on the side surface of the first nozzle 134, the side surface being on the side opposite to the electrode surface 131 across the end portion of the first nozzle 134 around the first outlet 132. In the state where each of the electrode surfaces 131 and the corresponding machined surface 12 approach to face each other as illustrated in FIG. 4, the recess portion 135 prevents the other two discharge electrodes 130 adjacent to the one discharge electrode 130 the from interfering with the first nozzle 134.

In the electrochemical machining device 100 according to the embodiment of the present invention, the support base 110 is connected to the rotary shaft 120 such that the support base 110 is attachable to and detachable from the rotary shaft 120. With this configuration, only the support base 110 damaged by the electrochemical machining is detachable from the rotary shaft 120 and replaceable with the new one.

In the electrochemical machining device 100 according to the embodiment of the present invention, the positioning plates 140 are each placed on the corresponding electrode holder 170 to position the discharge electrode 130. This configuration reduces variation of a positional relationship between each of the electrode surfaces 131 and the corresponding machined surface 12, so that the impeller 10 is machined at high accuracy. The shim may be inserted to the space between each of the discharge electrodes 130 and the corresponding positioning plate 140 to finely adjust a position of the discharge electrode 130.

In the electrochemical machining device 100 according to the embodiment of the present invention, each of the discharge electrodes 130 is connected to the corresponding electrode holder 170 such that the discharge electrode 130 is attachable to and detachable from the electrode holder 170. With this configuration, only the discharge electrode 130 damaged by the electrochemical machining is detachable from the electrode holder 170 and replaceable with the new one.

In the electrochemical machining device 100 according to the embodiment of the present invention, the second nozzle 136 disposed above each of the discharge electrodes 130 has the second outlet 133 from which electrolyte solution is discharged downward, the electrolyte solution flowing into the space between the electrode surface 131 and the machined surface 12. With this configuration, the electrolyte solution is supplied to the space between the electrode surface 131 and the machined surface 12 with a further uniform distribution of the electrolyte solution, so that the impeller 10 is machined at high accuracy.

In the electrochemical machining device 100 according to the embodiment of the present invention, the discharge electrode 130 and the first nozzle 134 are integrally formed such that the discharge electrode 130 and the first nozzle 134 are attachable to and the detachable from each other. With this configuration, as compared with a case where the discharge electrode 130 and the first nozzle 134 are integrally and indivisibly formed with each other, the discharge electrode 130 and the first nozzle 134 are easily manufactured and only the discharge electrode 130 damaged by the electrochemical machining is replaceable with the new one.

In the electrochemical machining device 100 according to the embodiment of the present invention, the discharge electrode 130 and the second nozzle 136 are integrally formed such that the discharge electrode 130 and the second nozzle 136 are attachable to and detachable from each other. With this configuration, as compared with a case where the discharge electrode 130 and the second nozzle 136 are integrally and indivisibly formed with each other, the discharge electrode 130 and the second nozzle 136 are easily manufactured and only the discharge electrode 130 damaged by the electrochemical machining is replaceable with the new one.

In the electrochemical machining device 100 according to the embodiment of the present invention, the second nozzle 136 is curved at the curved portion 137 as viewed from the upper side of the second nozzle 136, and the second outlet 133 is located above the electrode surface 131. In the state where each of the electrode surfaces 131 and the corresponding machined surface 12 approach to face each other as illustrated in FIG. 4, this configuration prevents any adjacent two of the second nozzles 136 from interfering with each other.

In the electrochemical machining device according to the first modified example, at least one of the passage of the electrolyte solution that flows to the first outlet 132 of the first nozzle 234 or the passage of the electrolyte solution that flows to the second outlet 133 of the second nozzle 136 has the flow conditioner. Thus, in the at least one of the first outlet 132 or the second outlet 133, the distribution of the discharged electrolyte solution is made uniform. The electrolyte solution is supplied to the space between the electrode surface 131 and the machined surface 12 with a further uniform distribution of the electrode surface 131, so that the impeller 10 is machined at high accuracy.

In the electrochemical machining device according to the second modified example, the first outlet 332 of each of the first nozzles 334 is formed of the wall surface 139 being continuous with the electrode surface 131 of the discharge electrode 130, the facing surface 332*a* of the first nozzle 334 facing the wall surface 139 with the space between the facing surface 332*a* and the wall surface 139, and the first connection surface 332*b* and the second connection surface 332*c* connecting the wall surface 139 to the facing surface 332*a*. With this configuration, the electrolyte solution discharged from the first outlet 332 of the first nozzle 334 flows along the wall surface 139 and the electrode surface 131 following the wall surface 139 to be supplied to the space between the electrode surface 131 and the machined surface 12 with a further uniform distribution, so that the impeller 10 is machined at high accuracy.

In the electrochemical machining device according to the third modified example, the second outlet 433 of the second nozzle 436 has the substantially circular shape as viewed from the lower side of the second nozzle 436, and the opening area of the second outlet 433 is comparatively large. This configuration supplies the electrolyte solution to the portion on which the electrolyte solution discharged from the first outlet 132 is less likely to flow between the electrode surface 131 and the machined surface 12 in the focused manner while decreasing the flow speed of the electrolyte solution discharged from the second outlet 433.

The embodiment disclosed herein is merely an exemplary embodiment of the present invention in all respects, and the present invention is not limited to the embodiment disclosed herein. The scope of the present invention is shown by not the above-described description but the claims, and all changes that fall within the claims and the meaning of equivalency of the claims are intended to be embraced by the claims.

REFERENCE SIGNS LIST

10 impeller
11 blade
12 machined surface
100 electrochemical machining device
110 support base
120 rotary shaft
130 discharge electrode
130*a* body
131 electrode surface
132, 332 first outlet
133, 433 second outlet
134, 234, 334 first nozzle
134*a*, 234*a* first engaged portion
135 recess portion
136, 436 second nozzle
136*a* second engaged portion
137 curved portion
139 wall surface
140 positioning plate
150 insulation plate
160 bolt
170 electrode holder
180 straight line driver
190 clamping mechanism
231 inlet
232 first narrow portion
233 second narrow portion
332*a* facing surface
332*b* first connection surface
332*c* second connection surface

The invention claimed is:

1. An electrochemical machining device configured to electrochemically machine a preformed impeller including a plurality of blades arranged along an outer periphery of the impeller, the electrochemical machining device comprising:

an electrode having an electrode surface formed to extend along a machined surface of one of the plurality of blades; and a first nozzle that is disposed adjacently to the electrode in a circumferential direction of the impeller and has a first outlet configured to discharge an electrolyte solution to flow into a space between the electrode surface and the machined surface along the electrode surface, wherein the electrode is located on one side in the circumferential direction of the impeller relative to the one blade, wherein the first nozzle is located on the other side in the circumferential direction of the impeller relative to the electrode, and wherein the electrochemical machining device further comprises a second nozzle that is disposed adjacently to the electrode in an axial direction of the impeller and above the electrode, the second nozzle having a second outlet configured to discharge the electrolyte solution to flow downward into the space between the electrode surface and the machined surface.

2. The electrochemical machining device according to claim 1, wherein the first nozzle and the second nozzle each have a passage of the electrolyte solution, and at least one of the passage of the first nozzle and the passage of the second nozzle has a flow conditioner.

3. The electrochemical machining device according to claim 1, wherein the electrode and the first nozzle are integrally formed such that the electrode and the first nozzle are attachable to and detachable from each other.

4. The electrochemical machining device according to claim 1, wherein the electrode and the second nozzle are integrally formed such that the electrode and the second nozzle are attachable to and detachable from each other.

5. The electrochemical machining device according to claim 1, wherein the electrode is integrally formed with each of the first nozzle and the second nozzle such that the first nozzle and the second nozzle are each attachable to and detachable from the electrode.

* * * * *